(12) United States Patent
Hwang et al.

(10) Patent No.: US 8,441,992 B2
(45) Date of Patent: May 14, 2013

(54) APPARATUS AND METHOD FOR SUPPORTING VERTICAL HANDOVER ON A WIRELESS COMMUNICATION SYSTEM

(75) Inventors: Eui-Seok Hwang, Hwaseong-si (KR); Jeong-Jae Won, Hwaseong-si (KR); Young-Seok Kim, Seongnam-si (KR); Su-Won Lee, Seongnam-si (KR); Xiaoyu Liu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1262 days.

(21) Appl. No.: 12/286,196

(22) Filed: Sep. 29, 2008

(65) Prior Publication Data
US 2009/0086679 A1   Apr. 2, 2009

(30) Foreign Application Priority Data
Oct. 2, 2007   (KR) .................. 10-2007-0099376

(51) Int. Cl.
*H04W 4/00*   (2009.01)

(52) U.S. Cl.
USPC .................................... 370/329; 370/331

(58) Field of Classification Search .................. None
See application file for complete search history.

(56) References Cited

U.S. PATENT DOCUMENTS

| | | | | |
|---|---|---|---|---|
| 7,380,000 | B2* | 5/2008 | Yaqub et al. ................ | 709/224 |
| 7,826,427 | B2* | 11/2010 | Sood et al. ................... | 370/331 |
| 7,983,218 | B2* | 7/2011 | Kesavan et al. .............. | 370/331 |
| 2003/0208602 | A1* | 11/2003 | Bhalla et al. ................ | 709/227 |
| 2007/0160049 | A1* | 7/2007 | Xie et al. ..................... | 370/390 |
| 2008/0242350 | A1* | 10/2008 | Gupta et al. .............. | 455/556.1 |
| 2008/0268847 | A1* | 10/2008 | Mukherjee et al. .......... | 455/436 |
| 2008/0301773 | A1* | 12/2008 | Achtari et al. ................... | 726/3 |

* cited by examiner

*Primary Examiner* — Chi Pham
*Assistant Examiner* — Soon-Dong D Hyun

(57) ABSTRACT

A broadband wireless communication system is provided. An apparatus for an information server (IS) comprises an event module for determining whether updating the network information of at least one access network (AN) is needed, a generator module for generating at least one Information_Get_Request packet for requesting the network information of the at least one AN when the updating is needed, a communication module for transmitting at least one Information_Get_Request packet to the at least one AN, and a database (DB) module for storing network information within an Information_Get_Response packet received from the at least one AN.

20 Claims, 9 Drawing Sheets

APPARATUS AND METHOD FOR SUPPORTING VERTICAL HANDOVER ON A WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Oct. 2, 2007 and assigned Serial No. 2007-99376, the entire disclosure of which is hereby incorporated by reference.

TECHNICAL FIELD OF THE INVENTION

The present invention relates to a wireless communication system. More particularly, the present invention relates to an apparatus and method for supporting vertical handover in a wireless communication system.

BACKGROUND OF THE INVENTION

In accordance with the progress of wireless communication techniques, wireless communication systems having various standards have been being developed. Wireless communication systems are designed to support user terminals accessing a backbone network through an air channel. That is, from the point of view of the end-to-end elements which are a service user and a service provider, it does not matter which standard is employed by a wireless communication system in using contents. Accordingly, a technique for maintaining a satisfactory condition of an air connection by enabling the performance of a seamless handover between different networks of different mediums is being studied.

There exists the Institute of Electrical and Electronics Engineers (IEEE) 802.21 Media Independent Handover (MIH) as a typical technique for handover between different networks. The handover between different networks is called a vertical handover. According to the MIH, event service, command service and information service are defined for vertical handover. The event service denotes recognizing change of physical information in air access link, the command service denotes handling control commands for the vertical handover, and the information service denotes managing network information on different networks. Accordingly, a mobile terminal (MT) gets proper network information by using services as stated above, and performs the vertical handover.

Network information for the vertical handover is provided by an information server (IS), which is a separate entity in a wireless communication system. The IS manages network information on a plurality of networks, and provides the network information upon a request from the MT. IEEE 802.21 MIH standard defines a list of the network information, which has to be maintained at the IS. However, ways for getting, maintaining, updating and managing the network information and a structure of the IS for the ways are not defined. Therefore, there is a need to provide the structure of the IS for supporting vertical handover in a practical wireless communication environment.

SUMMARY OF THE INVENTION

To address the above-discussed deficiencies of the prior art, it is a primary object of the present invention to address at least the above-mentioned problems and/or disadvantages and to provide at least the advantages described below.

Accordingly, an aspect of the present invention is to provide an apparatus and method for supporting vertical handover in a wireless communication system.

Another aspect of the present invention is to provide an apparatus and method for providing network information for a vertical handover.

In accordance with an aspect of the present invention, an apparatus for an Information Server (IS) in a wireless communication system is provided. The apparatus includes an event module for determining whether updating the network information for at least one access network (AN) is needed, a generator module for generating at least one Information_Get_Request packet for requesting the network information for the at least one AN when updating is needed, a communication module for transmitting at least one Information_Get_Request packet to the at least one AN, and a database (DB) module for storing network information within an Information_Get_Response packet received from the at least one AN.

In accordance with another aspect of the present invention, an operating method for an IS in a wireless communication system is provided. The method includes determining whether updating the network information for at least one AN is needed, generating at least one Information_Get_Request packet for requesting the network information for the at least one AN when updating is needed, transmitting at least one Information_Get_Request packet to the at least one AN, and storing network information within an Information_Get_Response packet received from the at least one AN.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a technique for providing network information which is needed for a vertical handover will be described. Hereinafter, an entity which provides the network information for the vertical handover will be addressed 'Information Server (IS)'.

The IS according to an exemplary embodiment of present invention stores network information about a plurality of access networks (ANs), and updates the network information when needed. For instance, the network information which is managed by the IS includes items shown in Table 1 below.

TABLE 1

| IE type | IE | description |
| --- | --- | --- |
| General IEs | TYPE_IE_NETWORK_TYPE | Available network link type |
| | TYPE_IE_OPERATOR_IDENTIFIER | Operator identifier of access network/core network |
| | TYPE_IE_SERVICE_PROVIDER_IIDENTIFIER | Identifier of service provider |
| Access Network Specific IEs | TYPE_IE_ACCESS_NETWORK_IDENTIFIER | Identifier of access network |
| | TYPE_IE_NETWORK_SYSTEM_ID | System identifier used by network |
| | TYPE_IE_ROAMING_PARTNERS | Roaming partner |
| | TYPE_IE_COST | Cost |
| | TYPE_IE_NETWORK_SECURITY | Security character in link layer |
| | TYPE_IE_NETWORK_QOS | QoS character in link layer |
| | TYPE_IE_NETWORK_DATA_RATE | Minimum/Maximum data rate in link layer |
| | TYPE_IE_NETWORK_IP_CONFIG_METHODS | Available IP configuration method |
| | TYPE_IE_NETWORK_CAPABILITIES | Bitmap for capabilities of access network |
| PoA Specific IEs | TYPE_IE_POA_ADDRESS | MAC address of PoA |
| | TYPE_IE_POA_LOCATION | Location of PoA |
| | TYPE_IE_POA_DATA_RATE | Minimum/Maximum data rate of PoA |
| | TYPE_IE_POA_CHANNEL_RANGE | Channel range/parameter of PoA |
| PoA Specific Higher Layer Service IEs | TYPE_IE_SUBNET_INFORMATION | Subnet information of PoA |
| | TYPE_IE_POA_IP_CONFIG_METHODS | IP configuration method supportable by PoA |
| | TYPE_IE_POA_CAPABILITIES | Bitmap for capabilities of PoA |
| | TYPE_IE_POA_IP_ADDRESS | IP address of PoA |
| Other IEs | Vendor Specific IEs | Vender specific IE |

In Table 1, the Point of Access (PoA) denotes a node which connects to a mobile terminal (MT) through air channel, and the roaming partner denotes a list of handover-able network candidates.

The IS gets, manages and provides the network information as shown in Table 1 by exchanging Media Independent Handover (MIH) packets with a Media Independent Handover Function (MIHF) of the MT and an MIHF of the AN.

Figure 1A:
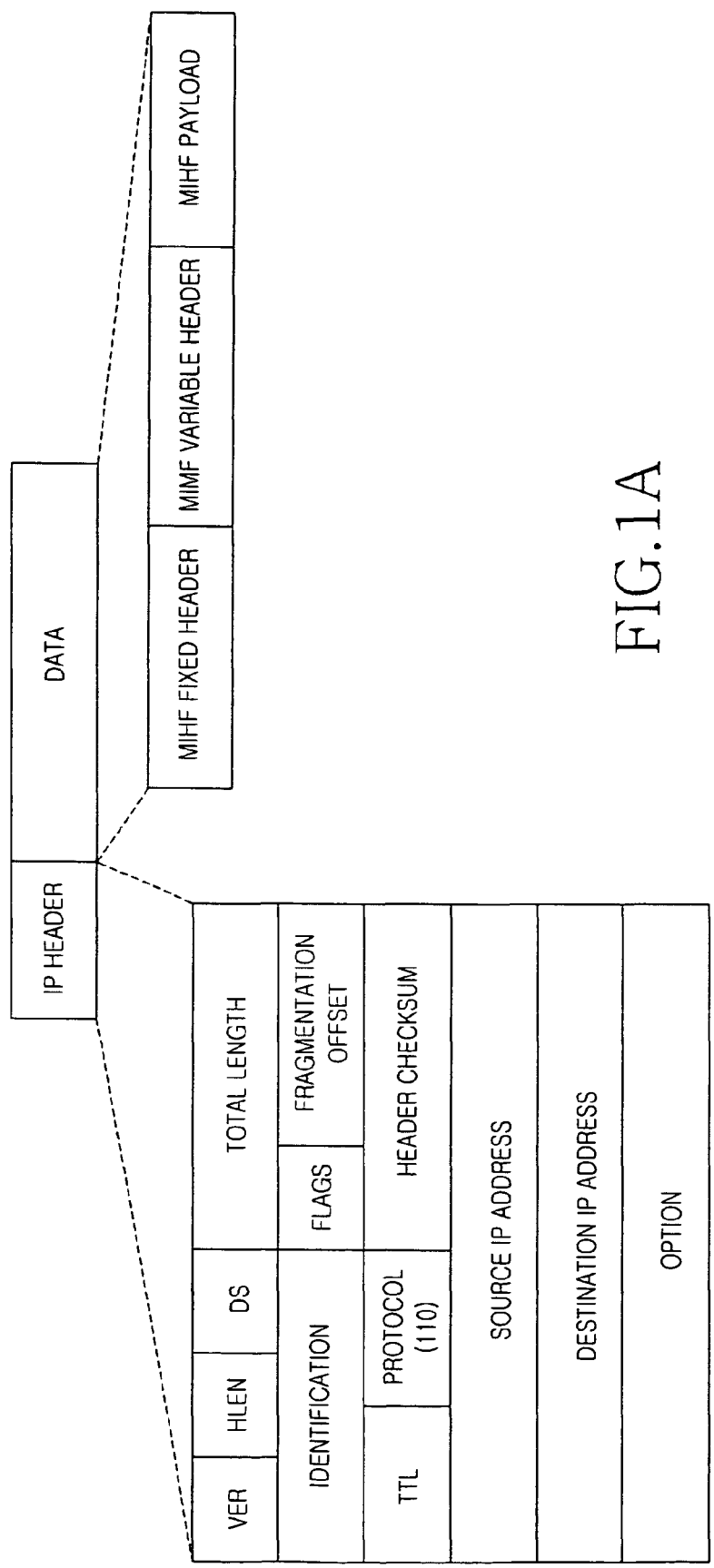
FIGS. 1A and 1B illustrate an example of a packet structure for getting and providing network information in a wireless communication system according to an exemplary embodiment of the present invention.
Figure 1B:
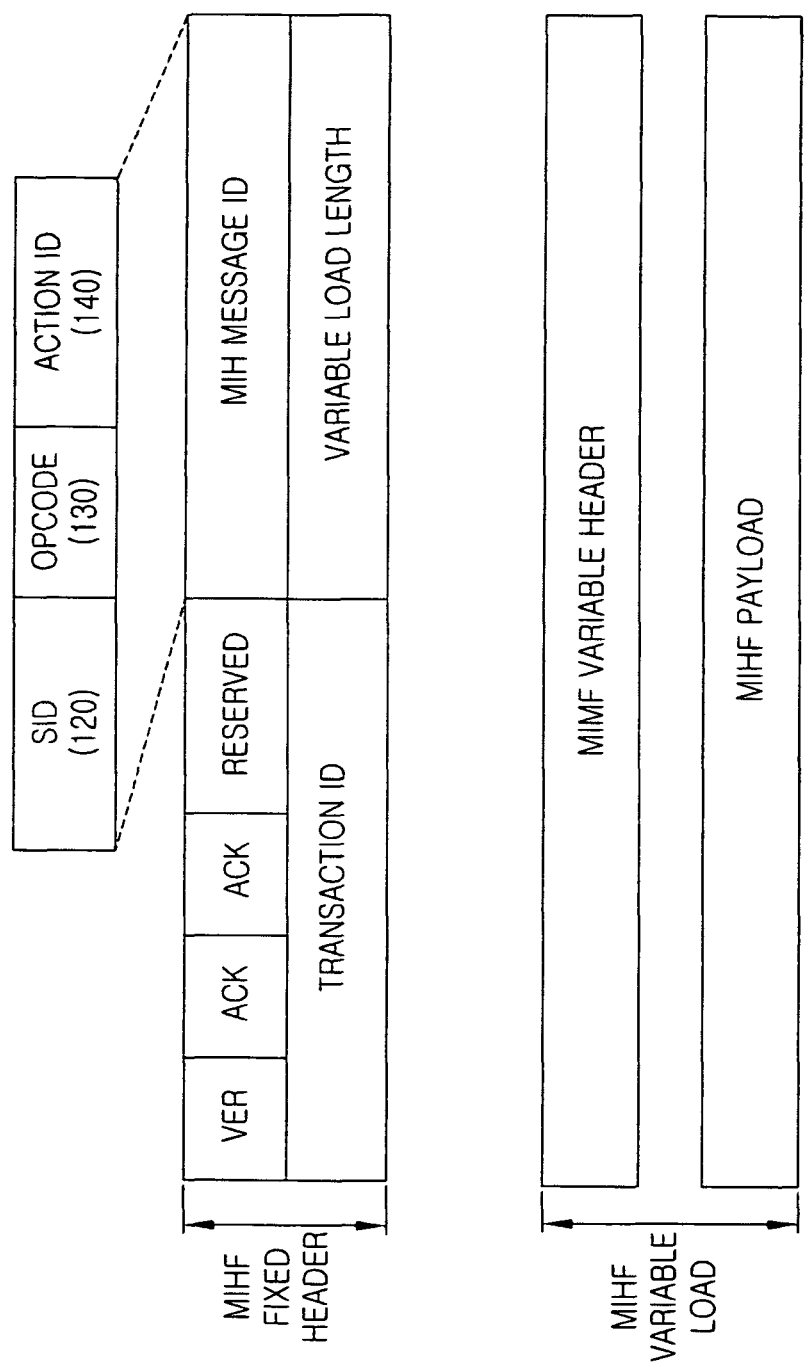

FIGS. 1A and 1B illustrate an example of a packet structure for getting and providing network information in a wireless communication system according to an exemplary embodiment of the present invention.

FIG. 1A illustrates a structure of an Internet Protocol (IP) packet, and the IP packet consists of an IP header and data. The IP header includes various fields. If the IP packet is an MIH packet, a protocol field 110 among the various fields is set to 'IPPROTO_MIH'. The data includes an MIH frame, and the MIH frame consists as shown in FIG. 1B.

The MIH frame includes an MIHF fixed header and an MIHF variable load. Particularly, an MIH message IDentifier (ID) within the MIHF fixed header consists of Session ID (SID) 120, Opcode 130 and Action ID 140. When the MIH frame is utilized for getting information or providing information, the SID 120 is set to 'Information_Service', and the Action ID 140 is set to 'MIH_Get_Information'. When the MIH frame is utilized for requesting information, the Opcode 130 is set to 'Request', and when the MIH frame is utilized for providing information, the Opcode 130 is set to 'Response'.

Figure 2:
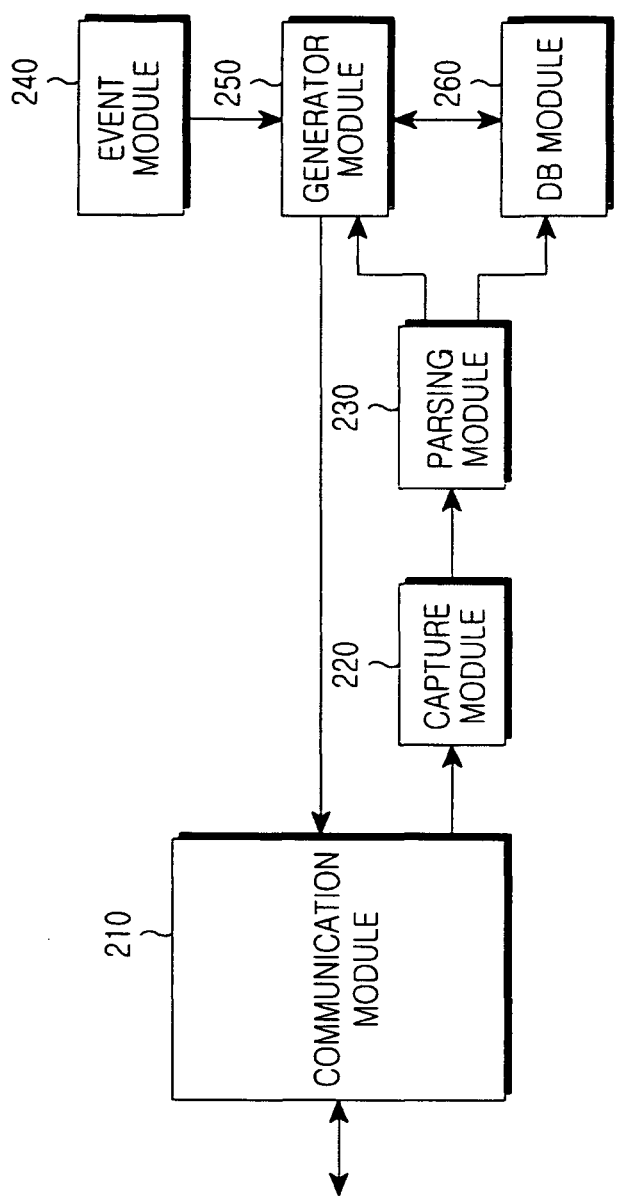
FIG. 2 is a block diagram of an information server (IS) in a wireless communication system according to an exemplary embodiment of the present invention.

FIG. 2 is a block diagram of an IS in a wireless communication system according to an exemplary embodiment of the present invention.

Referring to FIG. 2, the IS includes a communication module 210, a capture module 220, a parsing module 230, an event module 240, a generator module 250, and database (DB) module 260.

The communication module 210 performs a function for converting between bit streams and physical signals, and routing transmit and receive MIH packets for MTs and ANs.

The capture module 220 captures an MIH packet from packets received through the communication module 210 and provides the parsing module 230 with the MIH packet. More specifically, the capture module 220 receives the MIH packet. For instance, the capture module 220 may receive the MIH packet by using raw socket. After receiving a packet from kernel, the capture module 220 examines a protocol field in an IP header of the packet to determine whether the protocol field is set to 'IPPROTO_MIH' or not. If the protocol field is set to 'IPPROTO_MIH' (i.e., the packet is an MIH packet), the capture module 220 examines an Action ID field in an MIH header of the MIH packet to determine whether the Action ID field is set to 'MIH_Get_Information' or not. If the Action ID field is set to 'MIH_Get_Information', the capture module 220 extracts a source address field from the IP header and an MIH frame. Herein, the MIH frame is included in data range of the MIH packet. After that, the capture module 220 sends a message including the source address and the MIH frame to the parsing module 230.

The parsing module 230 classifies the MIH frame from the capture module 220 as an information request frame or an information response frame, and sends the information request frame or the information response frame to the generator module 250 of the DB module 260. More specifically, the parsing module 230 receives the MIH frame from the capture module 220, and determines whether the MIH frame is the information request frame or the information response frame by examining the Opcode field in the MIH header. When the MIH frame is the information request frame, the parsing module 230 examines whether there exists a Querier Location TLV in the MIH frame. If the Querier Location TLV exists, the parsing module 230 classifies the requested information type. For instance, requested information types are shown in Table 2 below.

TABLE 2

| No | Type | Identifier |
|---|---|---|
| 1 | TYPE_IE_NETWORK_TYPE | 0x10000000 |
| 2 | TYPE_IE_OPERATOR_IDENTIFIER | 0x10000001 |
| 3 | TYPE_IE_SERVICE_PROVIDER_IDENTIFIER | 0x10000002 |
| 4 | TYPE_IE_ACCESS_NETWORK_IDENTIFIER | 0x10000100 |
| 5 | TYPE_IE_ROAMING_PARTNERS | 0x10000101 |
| 6 | TYPE_IE_COST | 0x10000102 |
| 7 | TYPE_IE_NETWORK_STANDARDS | 0x10000103 |
| 8 | TYPE_IE_NETWORK_SECURITY | 0x10000104 |
| 9 | TYPE_IE_NETWORK_QOS | 0x10000105 |
| 10 | TYPE_IE_POA_ADDRESS | 0x10000200 |
| 11 | TYPE_IE_POA_LOCATION | 0x10000201 |
| 12 | TYPE_IE_POA_DATA_RATE | 0x10000202 |
| 13 | TYPE_IE_POA_CHANNEL_RANGE | 0x10000203 |
| 14 | TYPE_IE_SUBNET_INFORMATION | 0x10000204 |
| 15 | TYPE_IE_POA_CONFIG_METHOD | 0x10000205 |
| 16 | TYPE_IE_POA_CAPABILITIES | 0x10000206 |
| 17 | TYPE_IE_POA_IP_ADDRESS | 0x10000207 |
| 18 | TYPE_IE_POA_DHCP_SERVER_ADDRESS | 0x10000208 |
| 19 | TYPE_IE_POA_FA_AR_ADDRESS | 0x10000209 |
| 20 | TYPE_CONTAINER_LIST_OF_NETWORKS<br>Contained information:<br>Access Network Container #1<br>Access Network Container #2 (optional)<br>. . .<br>Access Network Container #k (optional)<br>Vender Specific IE (optional) | 0x10000300 |
| 21 | TYPE_CONTAINER_NETWORK<br>Contained information:<br>Network TYPE IE<br>Operator Identifier IE<br>Roaming Partners IE (optional)<br>Cost IE (optional)<br>Network Security IE (optional)<br>QoS IE (optional)<br>PoA Container #1<br>PoA Container #2 (optional)<br>. . .<br>PoA Container #k (optional)<br>Vender Specific Network IE (optional) | 0x10000301 |

TABLE 2-continued

| No | Type | Identifier |
|---|---|---|
| 22 | TYPE_REPORT_POA ==<br>TYPE_CONTAINER_POA<br>Contained information:<br>PoA Location IE<br>PoA Data Rate IE<br>PoA Channel Range IE<br>PoA Subnet Information IE<br>PoA IP Configuration Methods IE<br>PoA Capabilities IE<br>PoA PHY TYPE IE (No. 18)<br>PoA Address IE (No. 14)<br>Vender Specific PoA IE (optional) | 0x10000302 |

When the MIH frame is the information response frame, the MIH frame is transmitted by an AN. It is the network information within the MIH frame that is requested to each AN periodically by the event module 240. Accordingly, the network information is classified, and classified network information is sent to the DB module 260.

The event module 240 determines whether updating the network information is needed or not, and instructs the generator module 250 to generate an Information_Get_Request packet when the updating is needed. For instance, in case that the network information is updated periodically upon a predefined system setting, the event module 240 informs the generator module 250 of each passing period. More specifically, the event module 240 transmits the information request frame to each AN. The event module 240 maintains a list which has network information on each AN. Herein, the network information on the list is able to be controlled by using Command Line Interface (CLI).

The generator module 250 generates an Information_Get_Response packet for providing the network information to the MT and an Information_Get_Resquest packet for requesting network information to the ANs. More specifically, when a message including addresses of the ANs is sent from the event module 240, the generator module 250 generates an information request frame, and sets up the MIH header and the IP header. In this case, the Action ID field is set to 'MIH_Get_Information', the SID field is set to 'Information_Service', and the Opcode field is set to 'Request' in the MIH header. When a message having a result of classifying requested information is sent from the parsing module 230, the generator module 250 gets the requested information from the DB module 260, and generates an information response frame. In this case, the Action ID field is set to 'MIH_Get_Information', the SID field is set to 'Information_Service', and the Opcode field is set to 'Response' in the MIH header.

The DB module 260 stores the network information received from ANs. The network information stored by the DB module 260 includes the items shown in Table 1. More specifically, when a message including classified information is sent from the parsing module 230, the database module 260 executes an insert operation to store the classified information to database. On the other hand, when a message including a result of classifying requested information is sent from the generator module 250, the database module 260 executes a query operation to get the requested information from database, and returns the requested information to the generator module 250.

FIGS. 3A to 3E are flowcharts illustrating operating processes of each module within the IS in a wireless communication system according to an exemplary embodiment of the present invention.

Figure 3A:
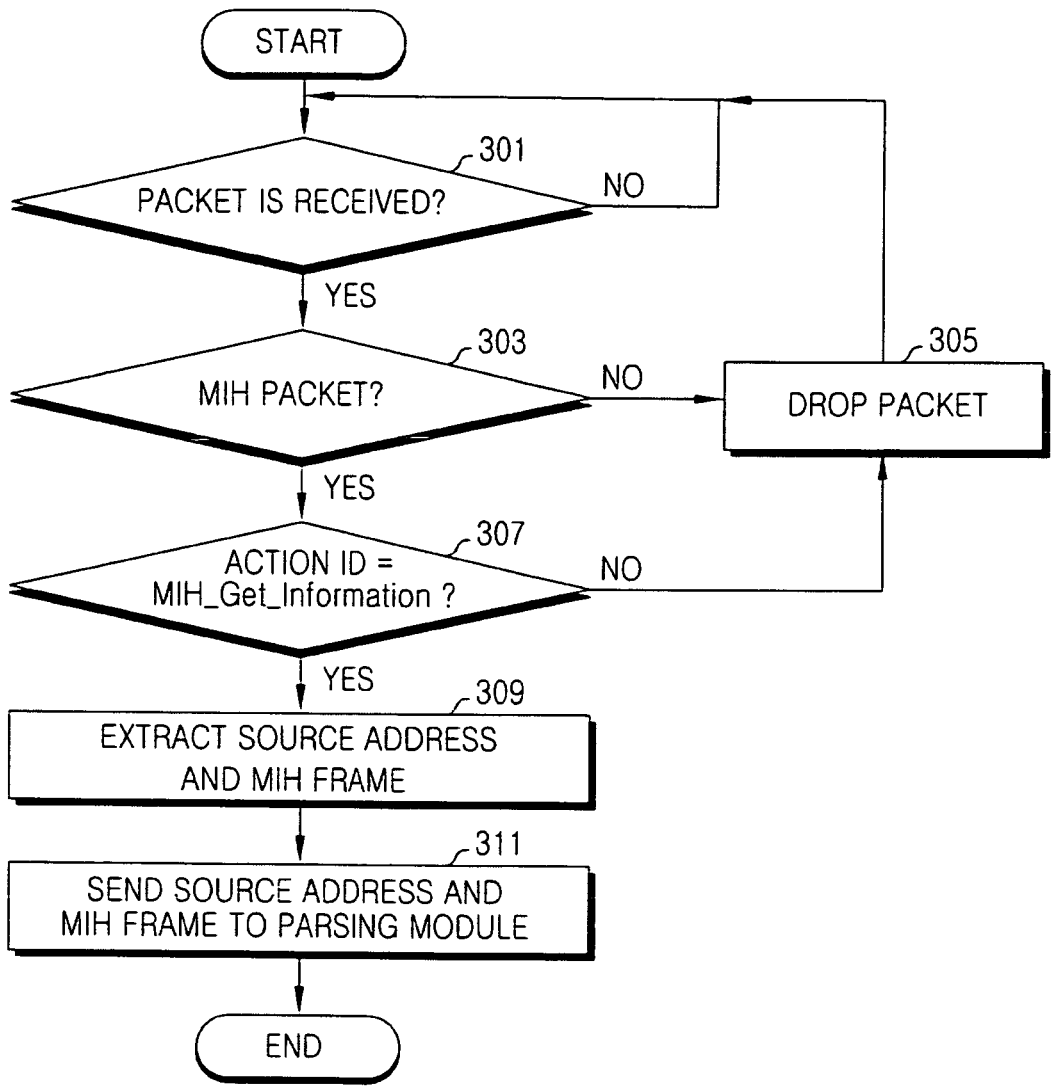
FIGS. 3A to 3E are flowcharts illustrating operating processes of each module within the IS in a wireless communication system according to an exemplary embodiment of the present invention.

Referring to FIG. 3A, the capture module 220 checks whether a packet is received or not in step 301. When the packet is received, the capture module 220 determines whether the packet is an MIH packet in step 303. In other words, the capture module 220 examines a protocol field in an IP header of the packet to determine whether the protocol field is set to 'IPPROTO_MIH' or not. If the protocol field is not set to 'IPPROTO_MIH' (i.e., the packet is not an MIH packet), the capture module 220 drops the packet in step 305, and returns the step 301. If the protocol field is set to 'IPPROTO_MIH' (i.e., the packet is an MIH packet), the capture module 220 examines an Action ID field in an MIH header of the MIH packet to determine whether the Action ID field is set to 'MIH_Get_Information' or not in step 307. If the Action ID field is not set to 'MIH_Get_Information', the capture module 220 drops the packet in step 305, and returns the step 301. If the Action ID field is set to 'MIH_Get_Information', the capture module 220 extracts a source address field of the IP header, and an MIH frame in step 309. After that, the capture module 220 sends a message including the source address and the MIH frame to the parsing module 230 in step 311.

Figure 3B:
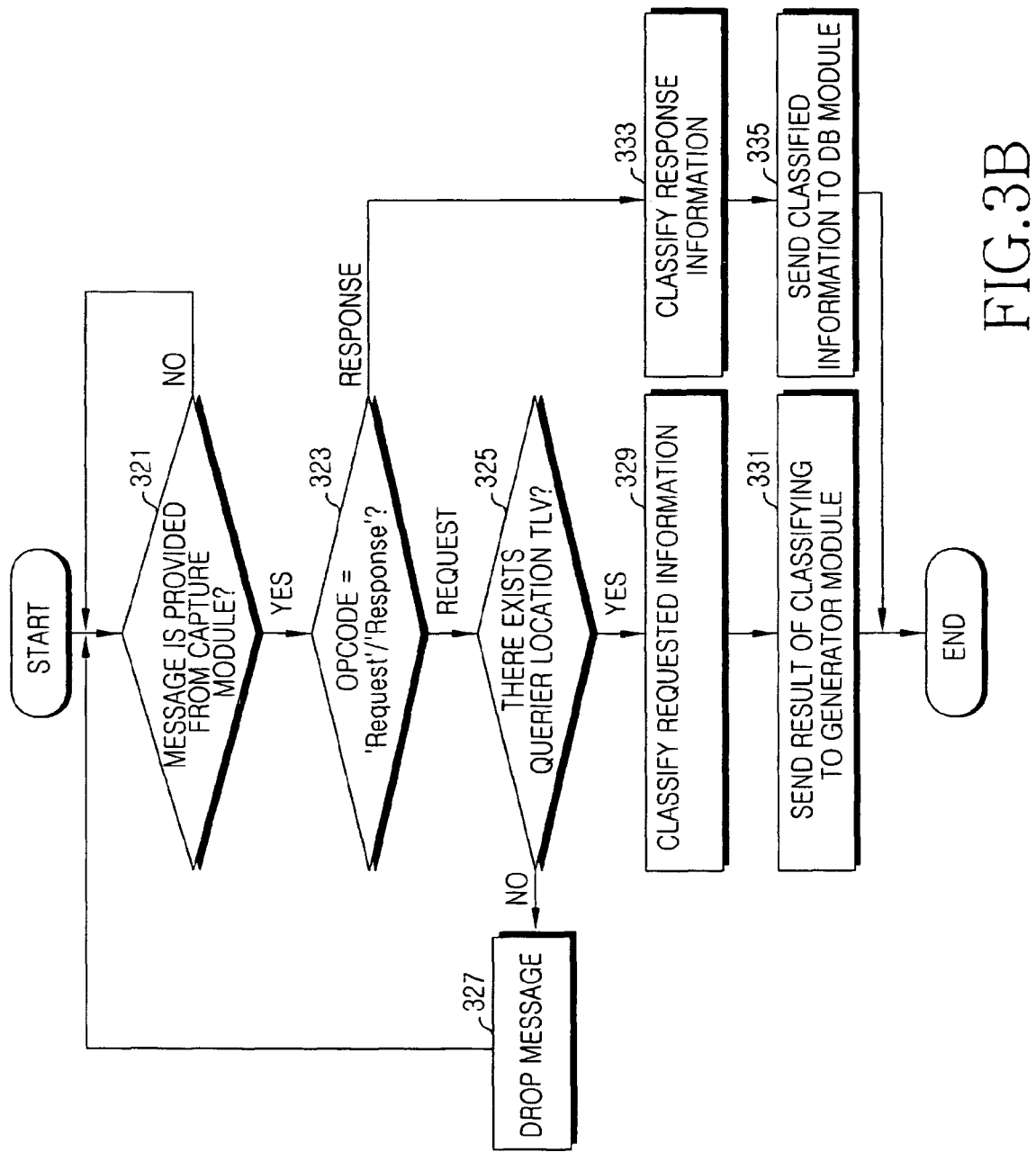

Referring to FIG. 3B, the parsing module 230 checks whether a message including an MIH frame and a source address is provided from the capture module 220 in step 321. When the massage is provided, the parsing module 230 determines whether the MIH frame is an information request frame or an information response frame by examining the Opcode field in the MIH header in step 323. If the MIH frame is an information request frame, the parsing module 230 examines whether there exists a Querier Location TLV in the MIH frame in step 325. If the Querier Location TLV does not exist, the parsing module 230 drops the message in step 327, and returns to step 321. If the Querier Location TLV exists, the parsing module 230 classifies the requested information type in step 329, and sends the result of classifying the requested information and the source address to the generator module in step 331. When the MIH frame is the information response frame, the parsing module 230 classifies the response information in step 333, and sends the classified response information to the DB module 260 in step 335.

Figure 3C:
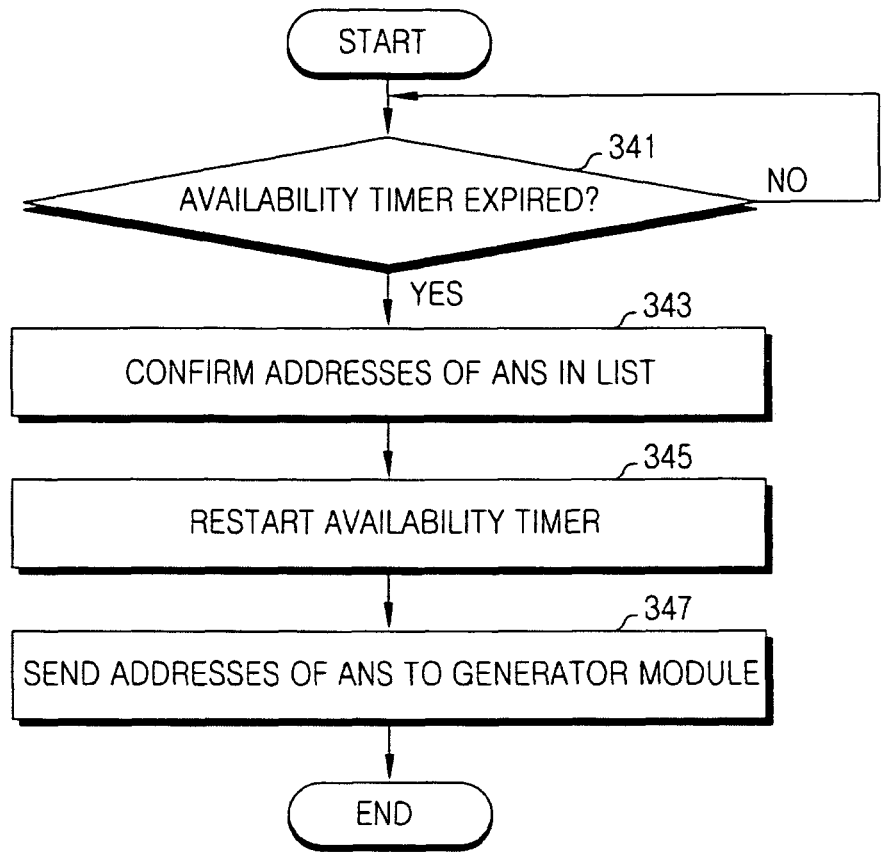

Referring to FIG. 3C, the event module 240 checks whether an availability timer about network information within a list has expired or not in step 341. When the availability timer has expired, the event module 240 confirms addresses of ANs in the list in step 343, and restarts the availability time in step 345. After that, the event module 240 sends a message including the addresses of the ANs to the generator module 250 in step 347.

Figure 3D:
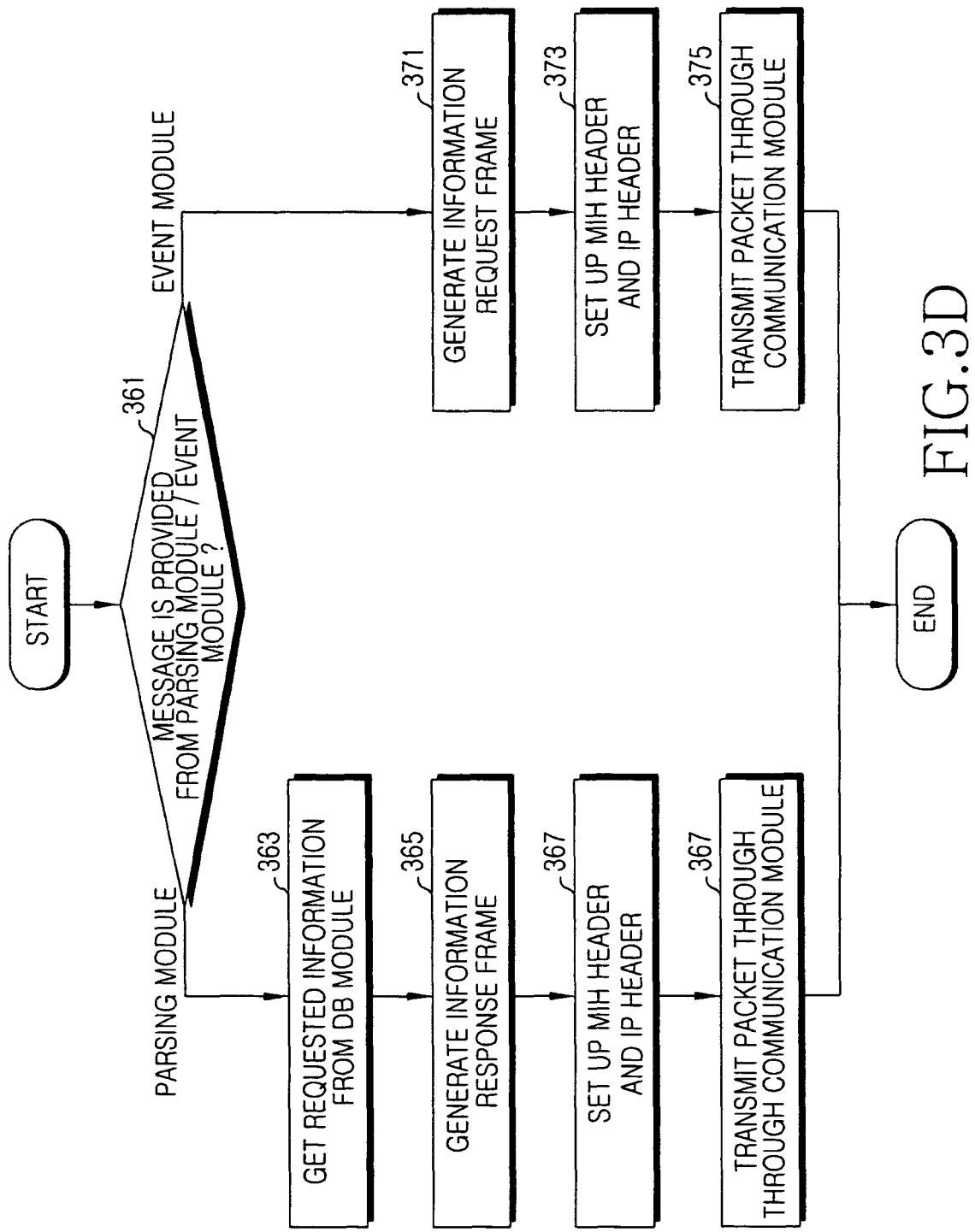

Referring to FIG. 3D, the generator module 250 checks whether a message is provided from the parsing module 230 or a message is provided from event module 240 in step 361. When the message including a result of classifying requested information is provided from the parsing module 230, the generator module 250 gets the requested information from the DB module 260 in step 363, and generates an information response frame in step 365. Then, the generator module 250 sets up an IP header and an MIH header in step 367, and transmits a packet consisting of the IP header and the information response frame. When the message including addresses of the ANs is provided from the event module 240, the generator module 250 generates an information request frame in step 371, and sets up the MIH header and the IP header in step 373. Then, the generator module 250 transmits a packet consisting of the IP header and the information request frame in step 375.

Figure 3E:
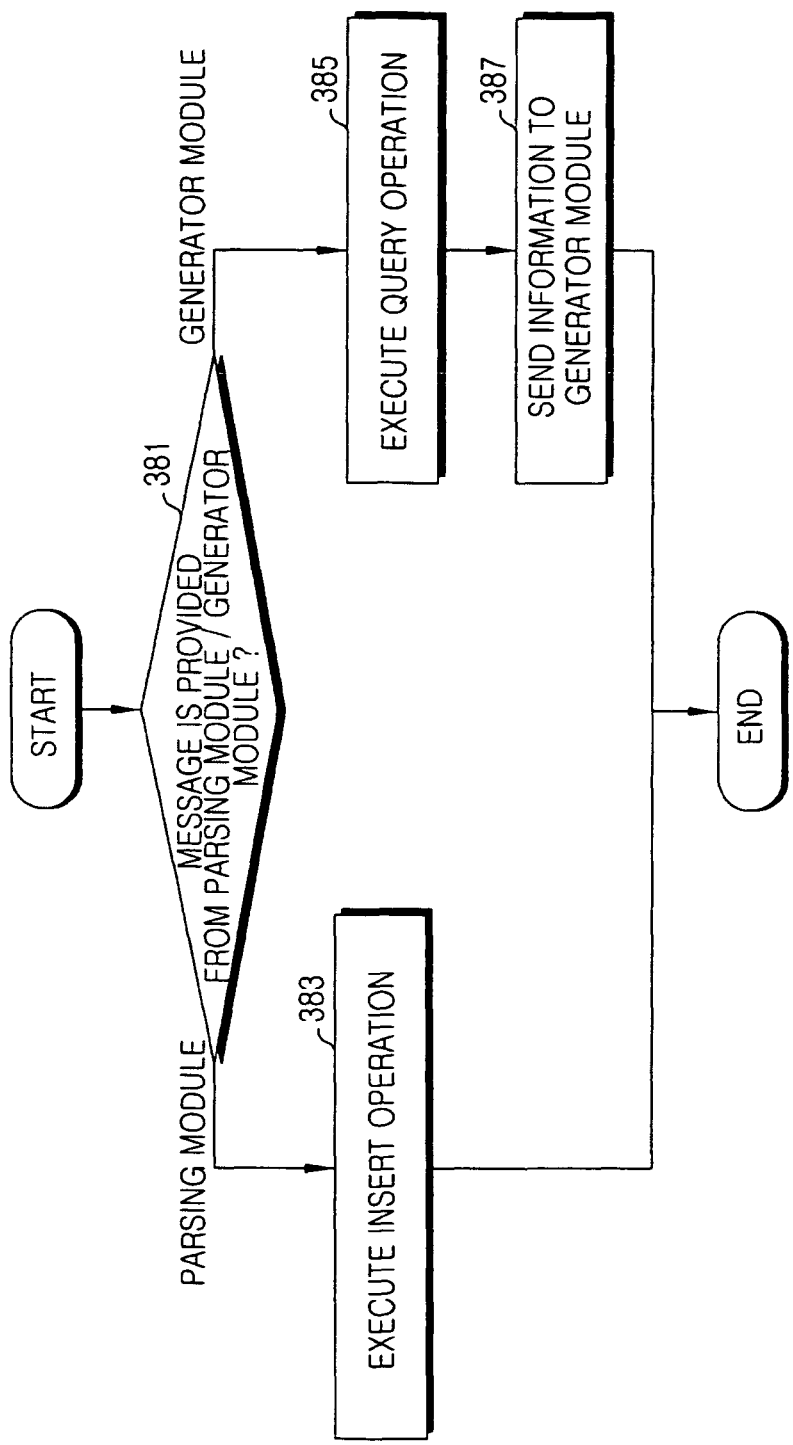

Referring to FIG. 3E, the DB module 260 checks whether a message is provided from the parsing module 230 or the generator module 250 in step 381. When the message including classified information and a source address is provided from the parsing module 230, the DB module 260 executes an insert operation in step 383. In other words, the DB module 260 updates network information corresponding to the source address. On the other hand, when the message including a result of classifying requested information is provided from the generator module 250, the DB module 260 executes a query operation in step 385. In other words, the DB module 260 gets the requested information from the database. After that, the DB module 260 sends the requested information to the generator module 250 in step 387.

Figure 4:
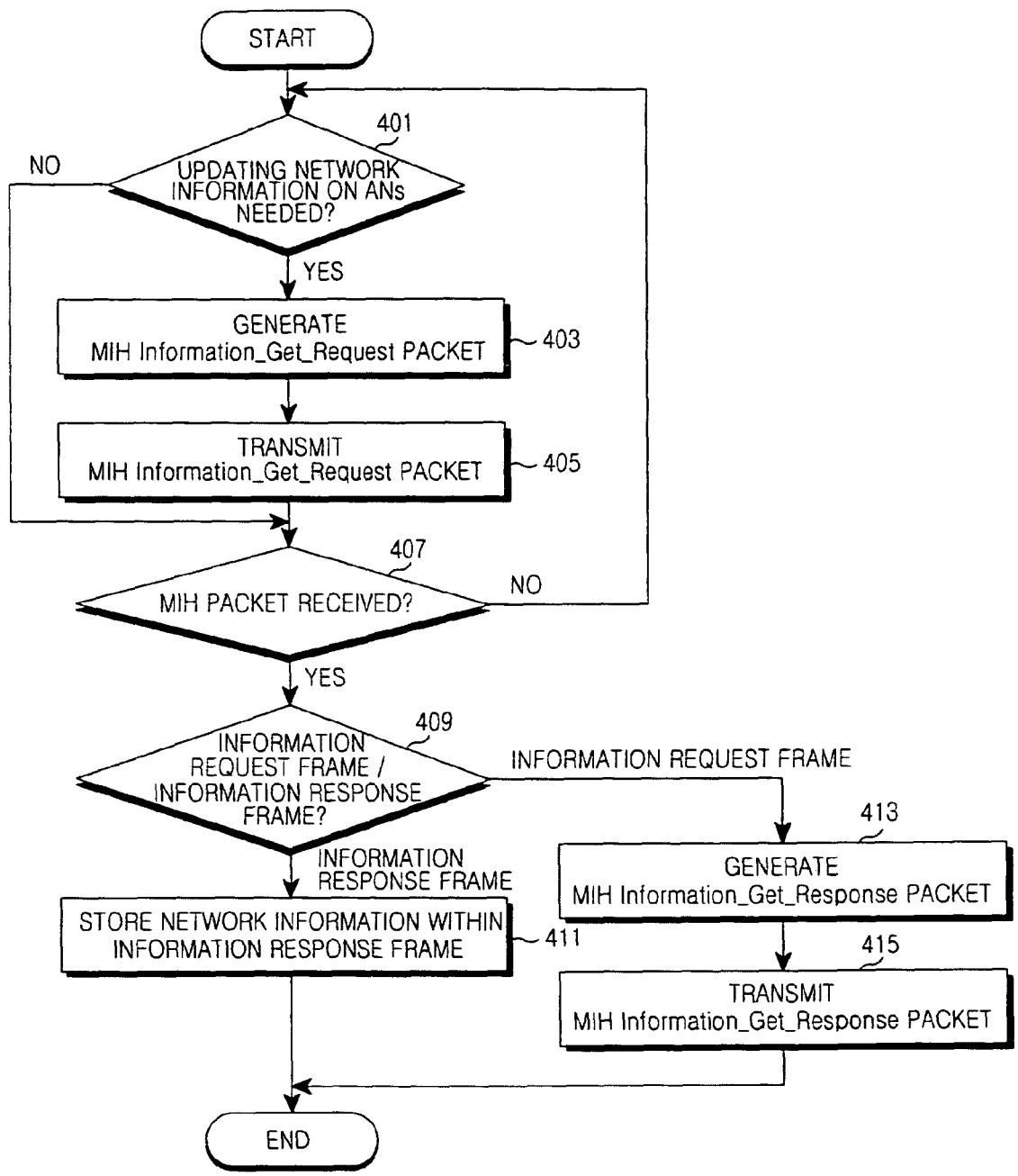
FIG. 4 is a flowchart illustrating operating processes of the IS in a wireless communication system according to an exemplary embodiment of the present invention.

FIG. 4 is a flowchart illustrating operating processes of the IS in a wireless communication system according to an exemplary embodiment of the present invention.

Referring to FIG. 4, the IS determines whether updating network information on the ANs is needed or not in step 401. The network information includes the items shown in Table 1, and is stored a database within the IS. For instance, in the case that the network information is updated periodically upon a predefined system setting, the IS determines to update the network information upon the passing of every time period.

When updating is needed, the IS generates an MIH Information_Get_Request packet for requesting the network information from the ANs in step 403. That is, the IS confirms addresses of the ANs in a list including the network information, and generates the MIH Information_Get_Request packets including the addresses of the ANs.

After generating the MIH Information_Get_Request packets, the IS transmits the MIH Information_Get_Request packets to the ANs in step 405.

Then, the IS checks whether an MIH packet is received or not in step 407. That is, the IS checks whether the MIH packet is captured from received packets. In other words, the IS checks whether there exists a packet including a protocol field set to 'IPPROTO_MIH' among the received packets.

When the MIH packet is received, the IS determines whether the MIH frame included the MIH packet is an information response frame or an information request frame in step 409. That is, the IS checks whether an Opcode field of the MIH frame is 'Request' or 'Response'. Herein, the information response frame is received from an AN, and the information request frame is received from an MT. Moreover, the information response frame is received as a response to the MIH Information_Get_Request packet transmitted in step 405, or is received without a request when network information for the AN is changed.

If the MIH frame is an information response frame, the IS stores the network information within the information response frame in step 411. That is, the IS classifies response information within the information response frame, and stores the response information to the database according to the result of classifying.

If the MIH frame is an information request frame, the IS gets information requested by the information request frame, and generates an MIH Information_Get_Response packet in step 413. In other words, the IS gets requested information from the database, and generates an information response frame. Then, the IS sets up an IP header and an MIH header. In this case, the IS sets an Action ID field to 'MIH_Get_Information', the SID field to 'Information_Service' and the Opcode field to 'Response' in the MIH header, and an protocol field to 'IPPROTO_MIH' in the IP header.

After generating the MIH Information_Get_Response packet, the IS transmits the MIH Information_Get_Response packet in step 415.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An information server (IS) in a wireless communication system, the IS comprising:
an event module configured to determine whether an updating of a network information of at least one access network (AN) is needed;
a generator module configured to generate at least one Information_Get_Request packet for requesting the network information of the at least one access network when the updating is needed;
a communication module configured to transmit at least one Information_Get_Request packet to the at least one access network; and
a database (DB) module configured to store the network information within an Information_Get_Response packet received from the at least one access network,
wherein the network information comprises characteristics of the at least one AN and characteristics of at least one Point of Access (PoA) associated with the at least one AN, and
wherein the IS is configured to provide an information service that manages the network information associated with a Media Independent Handover (MIH) on a plurality of different networks.

2. The IS of claim 1, further comprising:
a parsing module configured to classify an MIH frame in an MIH packet into an information request frame or an information response frame when the MIH packet is received from a mobile terminal (MT) or the access network.

3. The IS of claim 2, wherein the parsing module is configured to classify the MIH frame as the information request frame when an Opcode field in the MIH frame is set to 'Request', and classify the MIH frame as the information response frame when the Opcode field in the MIH frame is set to 'Response'.

4. The IS of claim 2, further comprising:
a capture module configured to capture the MIH packet from packets received through the communication module, and send the MIH packet to the parsing module.

5. The IS of claim 4, wherein the capture module is configured to capture a packet with a protocol field set to 'IPPROTO_MIH' among the packets.

6. The IS of claim 2, wherein the generator module is configured to generate an Information_Get_Response packet which includes information requested by the information request frame, and the communication module is configured to transmit the Information_Get_Response packet.

7. The IS of claim 6, wherein the generator module is configured to get requested information from the DB module, generate an information response frame, set an Action IDentifier (ID) field to 'MIH_Get_Information', set the Session IDentifier (SID) field to 'Information_Service', set the Opcode field to 'Response' in the MIH header, and set an protocol field to 'IPPROTO_MIH' in an Internet Protocol (IP) header.

8. The IS of claim 1, wherein the DB module is configured to confirm at least one address of the at least one access network in a list which includes the network information of the at least one access network when the updating is needed, and the generator module is configured to generate at least one Information_Get_Request packet which includes the at least one of address.

9. The IS of claim 8, wherein the updating is periodically performed.

10. The IS of claim 1, wherein the network information includes at least one of an available network link type, an operator identifier (ID) of the access network or a core network, an identifier of a service provider, an identifier of the access network, a system identifier used by a network, a roaming partner, a cost, a security character in a link layer, a Quality of Service (QoS) character in a link layer, a minimum/maximum data rate in a link layer, an available IP configuration method, a bitmap for one or more capabilities of the access network, a Media Access Control (MAC) address of a point of access (PoA), a location of a point of access, a minimum/maximum data rate of a point of access, a subnet information of a point of access, an IP configuration method supportable by a point of access, a bitmap for one or more capabilities of a point of access, an IP address of a point of access, and a vender specific information element.

11. An operating method for an information server (IS) in a wireless communication system, the method comprising:
determining whether an updating of a network information of at least one access network (AN) is needed;
generating at least one Information_Get_Request packet for requesting the network information of the at least one access network when the updating is needed;
transmitting at least one Information_Get_Request packet to the at least one access network; and
storing the network information within an Infonnation_Get_Response packet received from the at least one access network,
wherein the network information comprises characteristics of the at least one AN and characteristics of at least one Point of Access (PoA) associated with the at least one AN, and
wherein the IS is configured to provide an information service that manages the network information associated with a Media Independent Handover (MIH) on a plurality of different networks.

12. The method of claim 11, further comprising:
classifying an MIH frame in an MIH packet into an information request frame or an information response frame when the Miff packet is received from a mobile terminal (MT) or the access network.

13. The method of claim 12, wherein classifying the MIH frame comprises:
classifying the MIH frame as the information request frame when an Opcode field in the MIH frame is set to 'Request'; and
classifying the MIH frame as the information response frame when the Opcode field in the MIH frame is set to 'Response'.

14. The method of claim 12, further comprising:
capturing the MIH packet from packets that are received.

15. The method of claim 14, wherein capturing the MIH packet comprises:
capturing a packet including a protocol field set to 'IPPROTO_MIH' among the packets.

16. The method of claim 12, further comprising:
generating an Information_Get_Response packet which includes information requested by the information request frame; and
transmitting the Information_Get_Response packet.

17. The method of claim 16, wherein generating the Information_Get_Response packet comprises:

getting the requested information from the database;

generating an information response frame;

setting an Action IDentifier (ID) field to 'MIH_Get_Information', setting the Session IDentifier (SID) field to 'Information_Service' and setting the Opcode field to 'Response' in the MIH header; and setting a protocol field to 'IPPROTO_MIH' in an Internet Protocol (IP) header.

18. The method of claim 11, wherein generating at least one Information_Get_Request packet comprises:

confirming at least one address of the at least one access network in a list which includes the network information of the at least one access network when the updating is needed; and generating at least one Information_Get_Request packet which includes the at least one address.

19. The method of claim 18, wherein the updating is configured to be periodically performed.

20. The method of claim 11, wherein the network information includes at least one of an available network link type, an operator identifier (ID) of the access network or a core network, an identifier of a service provider, an identifier of the access network, a system identifier used by a network, a roaming partner, a cost, a security character in a link layer, a Quality of Service (QoS) character in a link layer, a minimum/maximum data rate in a link layer, an available IP configuration method, a bitmap for one or more capabilities of the access network, a Media Access Control (MAC) address of a point of access (PoA), a location of a point of access, a minimum/maximum data rate of a point of access, a subnet information of a point of access, an IP configuration method supportable by a point of access, a bitmap for one or more capabilities of a point of access, an IP address of a point of access, and a vender specific information element.

\* \* \* \* \*